US006442460B1

(12) United States Patent
Larson et al.

(10) Patent No.: US 6,442,460 B1
(45) Date of Patent: Aug. 27, 2002

(54) METHOD AND APPARATUS FOR NETWORKED WHEEL ALIGNMENT COMMUNICATIONS AND SERVICES

(75) Inventors: Timothy A. Larson, Ferguson; Timothy A. Strege, Ballwin; James M. Smith, Creve Coeur; David Voeller, St. Louis, all of MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/838,763

(22) Filed: Apr. 19, 2001

Related U.S. Application Data

(63) Continuation-in-part of application No. 09/655,777, filed on Sep. 5, 2000.

(51) Int. Cl.[7] .................................................. G06F 7/00

(52) U.S. Cl. ............................. 701/33; 701/29; 701/36; 280/86.75

(58) Field of Search ............................. 701/33, 29, 36; 280/86.75

(56) References Cited

FOREIGN PATENT DOCUMENTS

WO 9923783 5/1999

*Primary Examiner*—Yonel Beaulieu
(74) *Attorney, Agent, or Firm*—Polster, Lieder, Woodruff & Lucchesi, LCC

(57) ABSTRACT

A wheel alignment system including at least one sensing device for acquiring automotive data, interface circuitry in communication with the sensing device for transferring data representative of automotive data acquired by the sensing device, and a host computer in communication with the interface circuitry for performing a sequence of operations on the data transferred by the interface circuitry. The host computer provides integrated Internet access to allow for transmission to the vehicle wheel alignment system, from a remote server, via the Internet, updated information and software applications and components necessary to accurately diagnose a vehicle, and the return of diagnostic, statistical, and log information associated with the vehicle wheel alignment system. The host computer provides integrated Internet access to allow for transmission of electronic commerce and statistical information, alignment logs, error messages, status messages, or diagnostic information to a remote system, and for the receipt of information including updated software applications, diagnostic commands, and remote information queries therefrom.

35 Claims, 3 Drawing Sheets

METHOD AND APPARATUS FOR NETWORKED WHEEL ALIGNMENT COMMUNICATIONS AND SERVICES

CROSS-REFERENCE TO RELATED APPLICATIONS

This application is a continuation-in-part of co-pending U.S. patent application Ser. No. 09/655,777 filed on Sep. 5, 2000, from which priority is claimed and which is herein incorporated by reference.

STATEMENT REGARDING FEDERALLY SPONSORED RESEARCH OR DEVELOPMENT

Not Applicable.

BACKGROUND OF THE INVENTION

The present invention relates to automotive service equipment, and more particularly to computerized vehicle wheel alignment systems configured with software applications to exchange information with, and utilize software components stored on, remote computers in communication with the computerized vehicle wheel alignment systems via a computer network.

It is desirable that a computer associated with an automotive diagnostic or service system such as a vehicle wheel alignment system include an operating system which is fully compatible with local and global computer networks, such as the Internet, to exchange information with remote computers and databases. Examples of such currently available 32-bit operating systems include the Linux family of products and Microsoft Windows™ OS family of products. Such operating system are capable of running Internet browser software such as Microsoft's Internet Explorer or Netscape's Communicator, and may include the Windows™ OS family of products (such as Windows 2000, Windows CE/PocketPC, Windows ME, Windows XP) and Palm Computing's Palm-OS products. Future operating systems utilizing a 64-bit, 128-bit, or $2^n$-bit bases are anticipated as suitable logical extensions of current operating systems as computer hardware technology improves. Additional computing products on which vehicle wheel alignment systems having Internet access may be implemented include tablet-type computers, wearable computers, and pocket-type computers, both of which would be form factors highly suited for use in an automotive repair shop environment.

Computers included in traditional vehicle wheel alignment systems may provide limited access to a network of computers (e.g., LAN) and to the Internet, but generally do not integrate the Internet into associated automotive service, maintenance, repair or inspection software, such as wheel alignment applications. Instead, the computer operates as would any other PC, configured to browse the Internet without fully integrating the Internet into the software applications to utilize the availability of remote access and information exchange.

Conventional distributed application logic utilizes a distributed software object module system such as Microsoft's Distributed Component Object Model (DCOM). The problem with DCOM and other similar systems is that they don't scale to the Internet. Their reliance on tightly coupling the consumer of a service (i.e. software module) to the service itself implies a homogeneous infrastructure, and often means that such systems are very sensitive. If the implementation of the service (i.e. software module) is changed at either side (i.e., by the client or the remote host), the other side may become inoperative.

An example of such a system and method for distributed computer automotive service equipment is described in International Application No. WO 99/23783 to Snap-on Technologies, Inc. wherein computerized automotive service equipment is adapted to access one or more remotely located computer systems to retrieve or exchange the data and/or software necessary to analyze and diagnose a vehicle undergoing service using DCOM and ActiveX™ technology. For example, in the WO 99/23783 application, raw data from vehicle wheel alignment sensors mounted on a vehicle wheel is received on a local computer, and then transmitted to a remote system over a network wherein the raw data is processed and vehicle wheel alignment angles returned over the network to the local computer for display to a technician. Additionally disclosed is the transfer and exchange of vehicle OEM specifications from a remote system over the network to the local computers. However, the system disclosed in the WO 99/23783 application is not robust and adaptable to changes. For example, using the DCOM technologies results in a tightly coupled system wherein changes to the software application at either end of a communications link, i.e. at the automotive service equipment or at the remote system, can result in an inability for the components to communicate.

Using DCOM technologies means it is very difficult to guarantee a single, unified infrastructure. There is no guarantee that the service (i.e. software module) which the wheel alignment system needs to communicate with at the remote system will have the proper infrastructure, i.e. it might have been modified for use with a different operating system, object model, or updated with a new programming language, resulting in an incompatibility between the wheel alignment system and the remote system.

Service-orientated systems, such as those utilizing ONC RPC, DCE, COM, COBRA, RMI, and JINI™ protocols, generally require special protocols for communications. For example, a COM client must use the COM protocols to communication with a COM service. A JINI client must use the JINI protocols to communicate with a JINI service. Such special communications protocols are not common on the Internet, and firewalls routinely block the communication.

U.S. Pat. No. 5,657,233 to Cherrington et al. discloses a closed system for an integrated, highly automated, vehicle analysis system employing at least one technician terminal for displaying a plurality of inspection screens and for entering inspection results from which a report is generated. The '233 Cherrington et al. technician terminal may be coupled to a point-of-sale terminal through a network, which is used to generate a cost estimate report in response to an inspection report generated by the technician terminal. The '233 Cherrington et al. system includes a plurality of electronic databases for storing vehicle specifications, customer records, and a parts catalog database. Additionally disclosed in the '233 Cherrington et al. system is the interconnection between a plurality of point-of-sale terminals and a central server for the purpose of storing customer records and vehicle inspection reports in a central location. The '233 Cherrington et al. system is a completely closed system, in that it requires specific software applications to be in place on each element of the system, and changes to one element will render it incompatible with the remaining elements.

Emerging Internet technology, such as Microsoft ".NET" technology and also Sun™ Open Net Environment (Sun ONE) Software Architecture, shifts the focus from individual web sites and specific remote computers storing information to new constellations of computers, devices, and services which work together. Using Microsoft ".NET" and Sun ONE technology, hereinafter collectively referred to as "dot"-NET or NET, computers, devices, and services are able to collaborate directly with each other, enabling access to a user's data and compatible applications anywhere and from a wide variety of compatible device. Specifically, "dot"-NET technology joins the tightly coupled, highly productive aspects of traditional n-tier computing networks and systems, such as is seen in the WO 99/23783 application and the '233 Cherrington et al. patent discussed above, with the loosely coupled, message-orientated concepts of the Web to produce a style of computing known as Web Services Software Components.

A Web Service is a software application that exposes its features programmatically over the Internet or other computer network using a standard Internet communications protocol such as Hypertext Transfer Protocol (HTTP) or Extensible Markup Language (XML). Web Services Software Components can be utilized in software applications by calling Web application program interfaces (API's) just as they would call local services, with the difference being that the call is now routed across the Internet or other network to a service residing on a remote system.

In contrast to traditional tightly coupled systems utilizing DCOM and related technologies, Web Services Software Components employing "dot"-NET technology are loosely coupled. This means that changes to the software applications at either end of a connection will not affect the operation of the system. Web Services Software Components achieve this loose coupling by employing message-based asynchronous technology and Web protocols such as HTTP, Simple Mail Transfer Protocol (SMTP), and XML. Messaging systems wrap the fundamental units of communication into self-describing packages for transmission over the Internet or network. The only assumption a message sender makes about a message receiver in a message-based system is that the recipient will be able to understand the message being sent. The sender makes no assumptions about what will happen once the message is received, nor about what goes on between the sender and the receiver.

In contrast, the traditional tightly-coupled DCOM and related technology systems, the sender makes many assumptions about a communication receiver, and in particular, about how a software application or module will be activated and torn down, what the various elements in its interface are called, and so on.

The advantages of the Web Services Software Component message-based communication scheme are readily apparent. It enables a recipient to change a software application at any time without affecting a sender so long as the software application can continue to understand the communicated messages. The receiver is free to upgrade and improve without affecting current applications. Furthermore, the sender doesn't require any special software to be able to communicate with a receiver.

The "dot"-NET framework within which Web Services Software Components are implemented consists of three main parts: the common language runtime, a hierarchical set of unified class libraries, and an advanced version of Active Server Pages called ASP+. The common language runtime is responsible for notifications, managing memory allocation, starting up and destroying threads and processes, enforcing security policy, and satisfying any dependencies that a software component may have on other software components. The "dot"-NET runtime provides a unified environment across a wide variety of programming languages and hardware types. Similarly, the unified class libraries (API's) found in the "dot"-NET framework unify the disparate frameworks found in the various object oriented programming languages in use today. Developers of C++ traditionally use the Microsoft Foundation Classes, developers of Java use the Windows Foundation Classes, and developers of Visual Basic use Visual Basic APIs. By creating a common set of APIs across all programming languages, the "dot"-NET framework enables cross-language inheritance, error-handling, and debugging. Finally, ASP+ builds on the programming classes of the "dot"-NET framework to provide a Web application model in the form of a set of controls and infrastructure, such as interface components, session state management, and process recycling.

Therefore, it is desirable to develop a vehicle wheel alignment system which integrates a loosely coupled software application infrastructure with large scale local or global computer networks such as the Internet to provide a more efficient and accurate system than is currently available. Specifically, it is desirable to develop wheel alignment systems utilizing the "dot"-NET framework and software applications having black-box functionality which may be reused without concern for how the service is implemented, by providing well-defined user interfaces. In this manner, vehicle wheel alignment software applications can be assembled from a variety of components as needed, consisting of remote services accessed via the Internet, local services, and custom software written in an intermediate computer language. These remote and local services and custom software applications may further utilize a standard "dot"-NET framework or information exchange protocol, such as Microsoft's Simple Object Access Protocol (SOAP) to exchange information over the Internet.

BRIEF SUMMARY OF THE INVENTION

Briefly stated, an embodiment of the apparatus of the present invention is of an improved wheel alignment system which includes at least one conventional sensing device for acquiring automotive data, interface circuitry in communication with the sensing device for generating data representative of automotive data acquired by the sensing device, and a computer in communication with the interface circuitry. The computer is configured to provide integrated network access and to use "dot"-NET technology to utilize a variety of software applications or components, and collections of stored information, to perform a sequence of operations on the data generated by the interface circuitry to provide vehicle wheel alignment information.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

Figure 1:
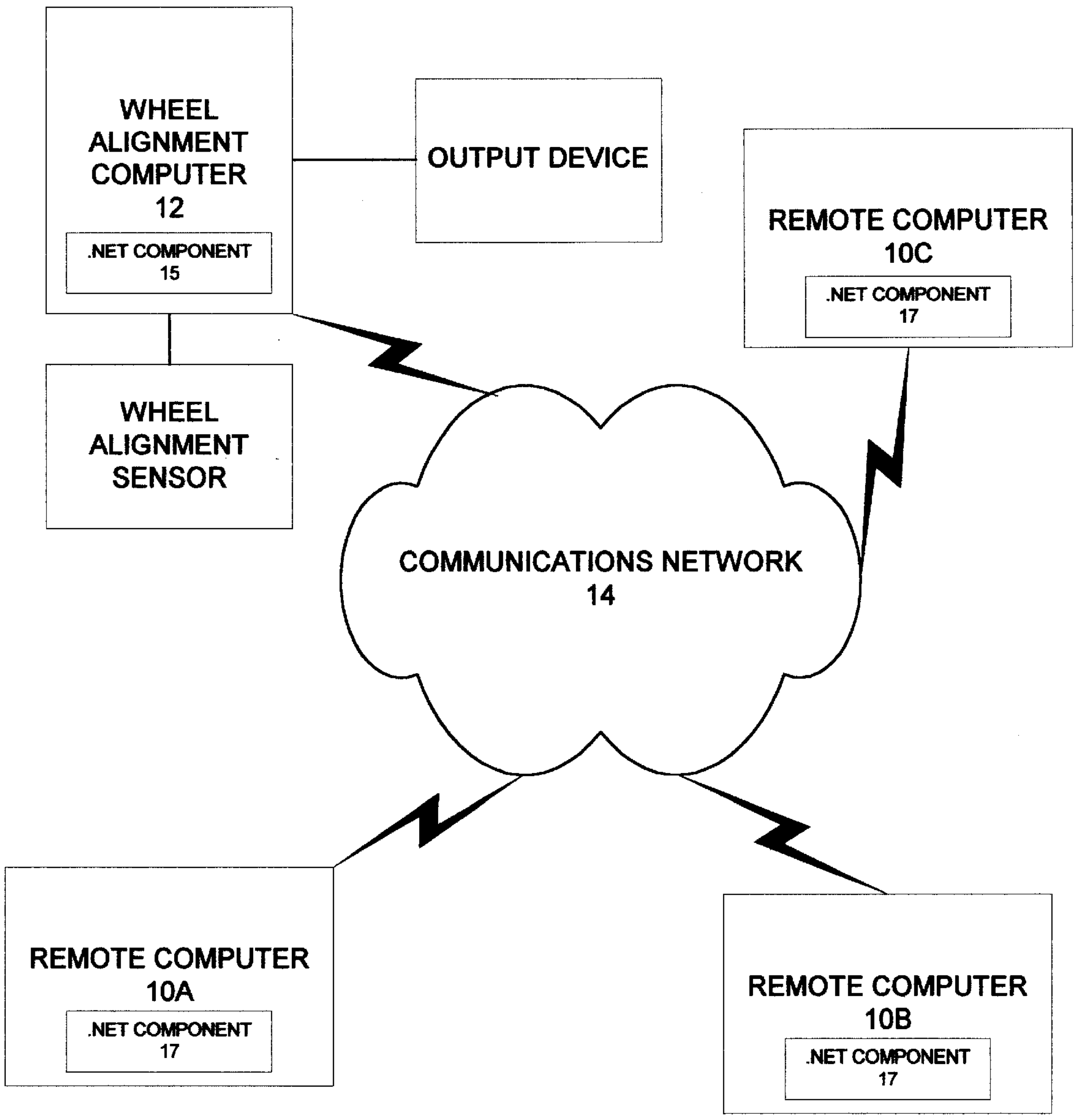
FIG. 1 is a representation of a wheel alignment system linked through a communications network to a plurality of remote computers.
Figure 2:
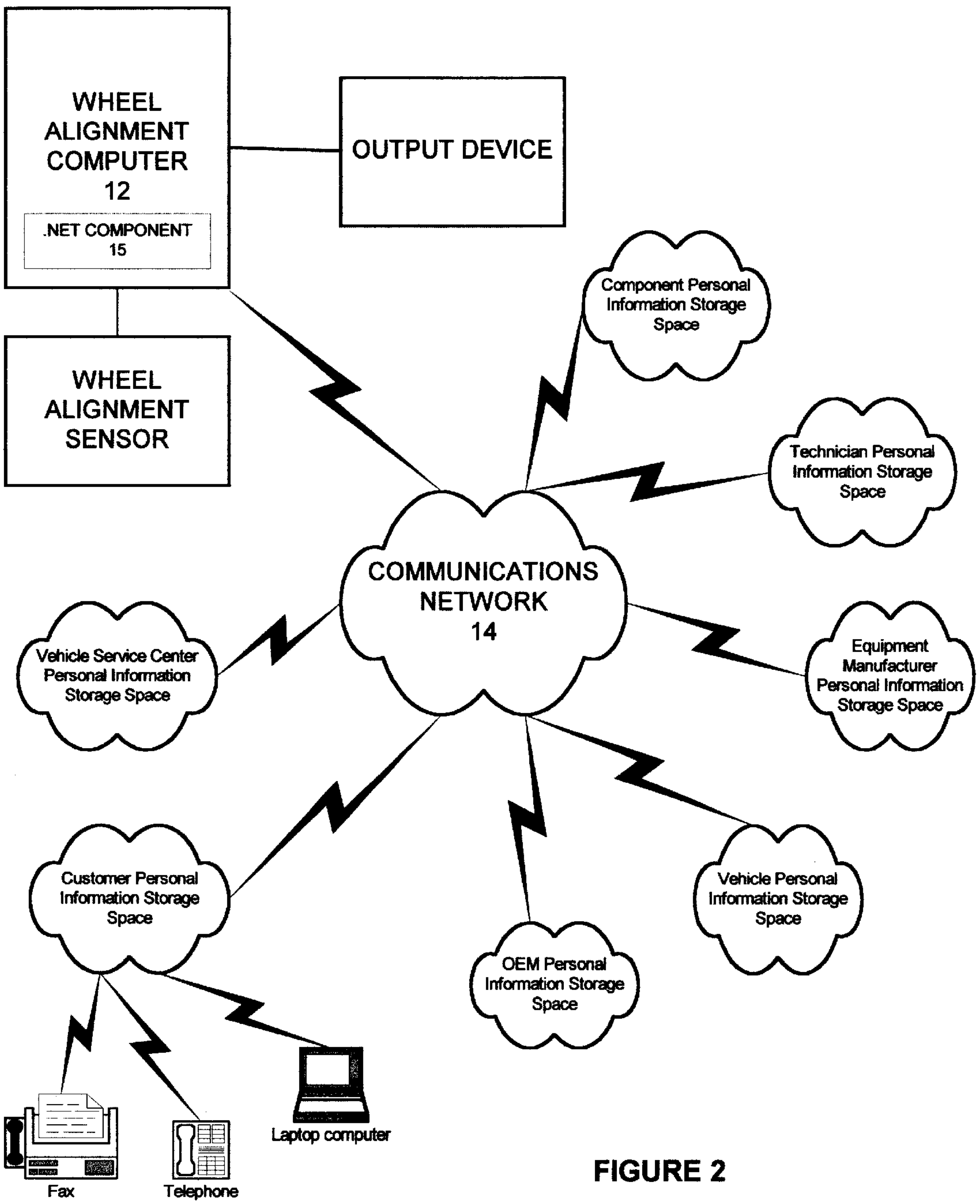
FIG. 2 is a representation of a wheel alignment system of the present invention linked through a communications network to a variety of personal information storage spaces.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

In a first embodiment of the present invention, a wheel alignment computer 12, which may be a general purpose computer, or may be a specialized logic circuit, is configured with vehicle wheel alignment software applications designed to utilize a variety of local and remote "dot"-NET Web Services Software Components 15, 17 to run on top of a "dot"-NET runtime system and utilize the features of a "dot"-NET framework to provide services associated with a vehicle wheel alignment operation. Such services may include, but are not limited to, measurement of wheel alignment angles, determination of corrective actions, customer notification, and inventory management. Web Services are software components that can be spontaneously discovered, combined, and recombined to provide a solution to a user's problem or request.

These software components may be written in a wide variety of computer languages, including XML, C#, Visual Basic, C++, Cobol, Perl, Java™, JScript and VBScript or may be partially implemented using Active Server Pages (ASP or ASP+) which are web pages with embedded code written in a scripting language. The actual operation of the vehicle wheel alignment software may take place either in an operating system itself, such as a Microsoft Windows™ interface, or may be partially implemented from within another program such as an Internet browser application.

Local "dot"-NET Web Services Software Components 15 are implemented and stored on the wheel alignment computer 12, while the remote "dot"-NET Web Services Software Components 17 are located on the remote systems 10A–10C. For example, the remote services and components 17 may comprise an alignment unit services software application, configured to provides services such as data acquisition, data storage, logging, software updates, and repair procedures to the wheel alignment computer 12.

Each of the service components 15, 17 may be written in a variety of different computer languages, but conform to the required "dot"-NET Web Services Software Component protocols for standardized interfaces, and may be accessed over the communications network 14, such as the Internet, using SOAP or other suitable protocol such as HTTP, XML, or FTP. Emerging protocols suitable for use by Web Services Software Components include UDDI (Universal Description Discovery and Interoperability), WSDL (Web Services Description Language), and ebXML (electronic business XML).

Local "dot"-NET Web Services Software Components 15 associated with the wheel alignment computer 12 may be accessed from the remote system 10A–10C or from other computer systems linked to the wheel alignment computer 12 via the communications network 14, such as the Internet connection. These local "dot"-NET Web Services Software Components 15 are configured to provide pathways to access status information, configuration information, customer information, or other information relating to the wheel alignment system with which they are associated. Additionally, local "dot"-NET Web Services Software Components 15 may be configured to provide the remote systems 10A–10C with access to diagnostic and repair procedures associated with the wheel alignment computer 12.

The remote "dot"-NET Web Services Software Components 17 associated with the remote system 10A–10C are accessible by the wheel alignment computer 12 via their respective communications network 14 connections, such as Internet connections, and are configured to permit the alignment computer 12 to exchange information to the remote systems, to access and run specific software components, and to acquire software updates which are stored on the remote system 10A–10C. A remote system 10A–10C may include, but is not limited to, a mobile computer associated with a vehicle undergoing service, or a remotely located computer system.

Each of the remote "dot"-NET Web Services Software Components 17 includes a complete "self-description" available in a standard format, such as XML, which includes details about the methods, properties, interfaces, and events supported by the service, as well as descriptive documentation in one or more languages. By utilizing remote "dot"-NET Web Services Software Components 17, those of ordinary skill in the art will readily recognize that the remote services required by the wheel alignment computer 12 may be stored on multiple remote systems 10A–10C. For example, one remote system 10C may be configured with remote services 17 responsible for updating software components, while a second remote system may be configured with remote services for acquiring and accumulating statistical information from the wheel alignment computer 12, or to provide security by controlling access to the alignment systems and remote systems. Additionally, a third party remote system may be utilized via remote services, such as Microsoft's "Passport" service which maintains information on the identity of individuals, thereby facilitating Internet-based transactions.

Using the "dot"-NET protocols, multiple versions of wheel alignment software or components may be installed on the wheel alignment computer 12 without conflict, to provide varying degrees of functionality and maintain compatibility with older and out-dated hardware components.

Utilizing the "dot"-NET framework and protocols, a wheel alignment computer 12 may be configured to permit an operating technician to select only those "dot"-NET software components and modules which will be needed to perform a desired vehicle alignment task. Using the ASP+ and "smart tag" features of the "dot"-NET framework, an operating technician may select desired local software objects and components 15, and desired remote software objects and components 17 to customize a vehicle wheel alignment software application on the wheel alignment computer 12. For example, a vehicle service center which specialized in the repair of a particular style or brand of vehicle, i.e. 4×4, Mercedes Benz, etc., may desire to only have access to alignment instructions for the style or brand of vehicle which they regularly service.

Vehicle specification names and labels could be filtered through a remote "dot"-NET software component or object such that the names and labels could be changed for international accounts (i.e. translated into a foreign language by a "dot"-NET translation component) and special accounts (i.e. using custom terminology). The alignment instructions and software procedures may also be changed for an individual customer account to conform to a customers needs.

Alternatively, one vehicle service center may desire to utilize 8-sensor alignment procedures, while another vehicle service center may utilize only 6-sensor alignment procedures, with each type of procedure contained within an individual "dot"-NET component. Vehicle service centers desiring non-standard alignment angle measurements may utilize the wheel alignment computer 12 which may be a general purpose computer, or may be a specialized logic circuit, to access remote software components 17 using the "dot"-NET framework which provides the specific angle calculations required, and displays the results on a display associated with the wheel alignment computer 12. In essence, the remote software components 17 are configured to access data signals received at the wheel alignment computer 12 from the various wheel alignment sensors, interpret the data, and provide a display of the calculated alignment angles.

Conversely, local "dot"-NET software components and objects on the wheel alignment computer 12 could be configured to provide remote "dot"-NET software components and objects with direct access to wheel alignment sensor data, thereby permitting the actual alignment angle calculations to be performed at a location remote from the wheel alignment computer 12 by one or more wheel alignment systems. Such remote access to sensor data permits individual sensors to be fault-checked from a remote site, or to be remotely monitored for proper calibration. Furthermore, software associated with individual wheel alignment sensors may be updated remotely using the "dot"-NET framework.

Accordingly, using the "dot"-NET framework, a wheel alignment computer 12 which may be a general purpose computer, or may be a specialized logic circuit, associated with a service center, such as an independent repair shop or a chain of repair shops, may locate and utilize a combination of local and remote software objects and components 15, 17 which provide a required degree of functionality and services associated with a vehicle wheel alignment. The combination of local and remote software objects and components 15, 17 which are utilized may be stored as a "dot"-NET preference in association with a collection of preferred settings, and recalled for future use. This facilitates the rapid setup of multiple alignment computers 12 with the same configuration in a single vehicle service center, or in multiple related vehicle services centers such as a chain of stores.

Those of ordinary skill in the art will readily recognize that these individual software objects and components which are utilized may be provided on a pay-per-use basis, thereby generating a revenue stream based upon the specific needs of an automotive service center or alignment technician. Furthermore, the remote software objects and components 17 utilized by the automotive service center may be updated with new software or appropriate vehicle specifications at any time by a remote computer 10A–10C without interfering with the operations at the automotive service center. In this manner, a customer would only be required to pay for updates to the wheel alignment software objects or components 15, 17 which they require or utilize.

The ability to customize the software objects and components utilized by a wheel alignment computer 12 can be further associated with the preferences of individual technicians operating the wheel alignment computer 12. For example, by storing the preferences of individual technician's as "dot"-NET preferences on a remote computer 10A–10C, any wheel alignment computer 12 may be rapidly configured to the preferred settings for that technician by recalling the stored preferences using the "dot"-NET framework. This permits individual technicians and service personnel to have the freedom to move between wheel alignment computers 12 in a single vehicle service center, or even between vehicle service centers, while retaining their preferred settings and/or software object and component usage.

Once example of "dot"-NET services which may be utilized by a wheel alignment computer system to customize settings and exchange information is the Microsoft "HailStorm" user-centric architecture and set of XML Web Services. Based upon the Microsoft Passport user authentication system, HailStorm services take advantage of the "dot"-NET technologies and architecture to permit services and applications to cooperate for a user's benefit, as well as allowing users, groups, and organizations to share and collaborate information. HailStorm is a user-centric architecture and set of services for "dot"-NET that deliver personally relevant information through the Internet to a user, to software running on the user's behalf, or to devices working for the user.

Incorporation of the HailStorm services into the vehicle wheel alignment system of the present invention permits the vehicle wheel alignment computer 12 to share and collaborate information related to the operational status of such things as the wheel alignment system itself, individual technician preferences, vehicle service center preferences, and/or customer preferences with a variety of remote systems.

To achieve this level of customizability for wheel alignment computers 12, each individual utilizing the computer 12 which may be a general purpose computer, or may be a specialized logic circuit, has access to one or more personal information storage spaces for the purpose of storing and retrieving information therein. These "dot"-NET personal information storage spaces may be implemented as an isolated storage on a remote computers 10A–10D, and accessed using the "dot"-NET's XML Store and SOAP (Simple Object Access Protocol) to transfer that information to whatever computer 12 they are currently utilizing. The personal information storage spaces may contain alignment computer login preferences such that the technician can log into any compatible wheel alignment computer 12 at any location, using an Internet browser software application, and utilize their personal login preferences for configuration and setup of the wheel alignment computer 12.

The "dot"-NET framework provides services for identifying levels of authentication to access personal information storage spaces, ranging from simple password access to digital wallets or smart cards, and biometric devices such as fingerprint and retinal-scan devices. Using "dot"-NET framework, authentication and security features may be utilized to monitor access to controlled software objects and components. For example, individual wheel alignment computers 12 could be assigned a unique identification code, which is compared against a list of authorized users when a specific remote "dot"-NET software component or object 17 is requested for use.

Wheel alignment computers 12 which may be general purpose computers, or may be a specialized logic circuits, of the present invention may be further configured to access "dot"-NET personal information storage spaces associated with customers, vehicles, Original Equipment Manufacturers, and parts. For example, every customer that has a "dot"-NET personal information storage space will have the option of having their vehicle's alignment data stored in their "dot"-NET personal information storage space. This store of information can be done live by the alignment computer 12 as the vehicle service progresses, permitting the customer to view the progress of the repair from a remote computer 10A–10C, such as a hand-held device or home computer, configured to access the "dot"-NET personal information storage space. Such a "live" store of vehicle alignment information may be further utilized by a technician to view the vehicle information on a "dot"-NET compatible device from a location in the vehicle service center remote from the computer 12. Alternatively, the store of vehicle information can be done upon completion of the vehicle services. The customer's vehicle alignment data may then be made available in a secure fashion to the customer and to any vehicle service center performing subsequent work on the customer's vehicle.

The vehicle's alignment data may be saved by the wheel alignment computer 12 in a "dot"-NET personal information storage space associated directly with the vehicle itself, which may be stored in a remote computer 10A–10C incorporated into the vehicle itself, such as an engine management computer. Such information, together with other stored vehicle maintenance and repair information, may be maintained for the lifetime of the vehicle, and accessed by inspection, service, and repair technicians from many different vehicle service centers using the "dot"-NET framework, providing an invaluable history of the vehicle independent of the vehicle's owner. Access using the "dot"-NET framework to such stored lifetime vehicle information may be further utilized by various state inspection agencies to automate yearly vehicle inspection procedures.

In addition to being configured to store a vehicle's alignment data stored in a customer's "dot"-NET personal information storage space (such as an XML Store), a wheel alignment computer 12 of the present invention may further store a receipt of the services performed on the vehicle using the "dot"-NET framework SOAP protocol. Such a receipt may include conventional information, such as the vehicle condition before entering the shop (mileage, damage, etc.), a listing of work the customer requested to be performed, a listing of the services actually performed, an itemized cost for the services, and a listing of suggested further services or maintenance reminders. Such stored information may include textual descriptions or digital photographs of damages or repair vehicle components.

Once the services associated with a vehicle wheel alignment are completed, the wheel alignment computer 12 of the present invention may be configured to utilize the "dot"-NET Notification and Messaging framework to automatically signal the customer. Such a notification may be carried out via email, an electronic pager signal, an automated phone call etc. by a "dot"-NET software component which interacts with "dot"-NET Notification and Messaging preferences previously established in the customer's "dot"-NET personal information storage space. Alternatively, using a "dot"-NET framework, voice commands spoken by a technician can direct the wheel alignment computer 12 to establish a voice communications channel to the customer, using the customer's previously established "dot"-NET communication preferences. In this manner, a customer may be notified at their convenience, in the manner in which they desire.

Once a customer has been notified by the wheel alignment computer 12 via their "dot"-NET Notification and Messaging preferences that their vehicle service is complete, they may review any receipt of services stored in their "dot"-NET personal information space by the computer 12. Such review of the receipt may be done by the customer from any computer system configured to utilize the "dot"-NET framework, and may include an office computer, a hand-held computer, or a other suitably configured hardware platform. The customer may further be provided with a secure option to authorize an automated payment for the services identified on the stored receipt, facilitating the pickup of the vehicle from the vehicle service center.

The wheel alignment computer 12 may optionally be configured to utilize the "dot"-NET framework to access either alignment equipment manufacturer or vehicle Original Equipment Manufacturer (OEM) "dot"-NET personal information storage spaces, to retrieve current alignment specification or alignment adjustment instructions for a particular make or model of vehicle. For example, if a customer requests an alignment service on 1954 Ford pickup truck, the wheel alignment computer 12 may communicate over the Internet using the "dot"-NET framework with a Ford Motor Company "dot"-NET personal information storage space, and retrieve wheel alignment specifications and alignment adjustment instructions for that specific vehicle. In this manner, updating of the such information for old and new vehicles may be handled remote from the wheel alignment computer, by the OEM's, without the need to continually install updated information directly on the wheel alignment computer 12.

Similarly, the wheel alignment computer 12 located at a vehicle repair facility owned by a larger entity or parent may be configured to utilize the "dot"-NET framework to access a "dot"-NET personal information storage space associated with the larger entity or parent. Information stored in the parents "dot"-NET personal information storage space which may be retrieved by the alignment computer 12 using "dot"-NET communication protocols may include company newsletters, advertisements, or updated information . Correspondingly, the wheel alignment computer 12 could store in the parent's "dot"-NET personal information storage space statistical information related to the various tasks and services completed during the day by the wheel alignment computer 12, facilitating the collection of information by the parent company.

When parts are needed to complete an alignment adjustment, traditionally, the operating technician would be required to contact the vehicle service center parts department or warehouse, or manually access an online parts inventory. Using the wheel alignment computer 12 of the current invention, the computer 12 may be configured to utilize the "dot"-NET framework to access a "dot"-NET personal information storage space associated with a needed alignment adjustment component or part. Information contained in the part's "dot"-NET personal information storage space may include details related to on-hand inventory, back-order status, part pricing, as well as acceptable substitute parts. The wheel alignment computer 12 could request delivery of an available part to the technician, or could be configured to automatically order a needed alignment adjustment part. The "dot"-NET Notification and Messaging framework would be utilized to notify the wheel alignment computer 12 (or the technician directly using previously established "dot"-NET preferences) of the delivery progress of the alignment adjustment component or part.

Several advantages are achieved when a wheel alignment computer 12 is configured to utilize the "dot"-NET framework to access local and remote software objects and components 15, 17 in performing a wheel alignment service.

For example, remote software objects and components 17 need not be located on the same remote computer 10A–10C, but may be distributed throughout the Internet in a logical fashion. For example, vehicle specification software components may be maintained at the respective vehicle manufacturer computers, while alignment calculation components may be maintained on another remote computer. Further, software components required to utilize different alignment sensors may be maintained on a third remote computer. As new wheel alignment sensor designs are developed, the associated software may be released as a "dot"-NET software component or object, thereby permitting anyone acquiring the new sensors to simply access the required software via the Internet. Similarly, new alignment procedures may be implemented as "dot"-NET software components and objects designed to supplement or replace conventional wheel alignment procedures. As a technician or vehicle service center desired to utilize the new alignment procedures, they need merely to access the appropriate remote "dot"-NET software component or object 17.

By utilizing the "dot"-NET framework, each of these remote "dot"-NET software objects or components 17 may be utilized simultaneously by multiple wheel alignment computers 12 located at a variety of locations. This facilitates the distribution of upgrades and improvements, as the changes will need to be made only at a few central locations.

Those of ordinary skill in the art will further recognize that a variety of methods and systems may be implemented to facilitate payment for services offered and rendered by use of the apparatus and methods of the present invention set forth above. In one alternate embodiment, the system of the present invention may be configured to facilitate electronic commerce wherein automotive repair shop technicians or wheel alignment system operators may place orders for services or information from a remote computer 10A–B through the alignment system computer 12 and associated communications links 14. Such services or orders may be paid for using the communication link 14 to transfer suitable payment information, such as pricing, credit card or other payment account information.

Conventional electronic commerce protocols, such as the Electronic Commerce Modeling Language (ECML) which designates standardized information formats and Digital Wallets, may be utilized with the present invention to facilitate payment for services or products ordered through the remote system computer 10A–B. To ensure security, all electronic commerce transactions may utilize the Secure Socket Layer (SSL) technology when transferring information over the communications link.

Figure 3:
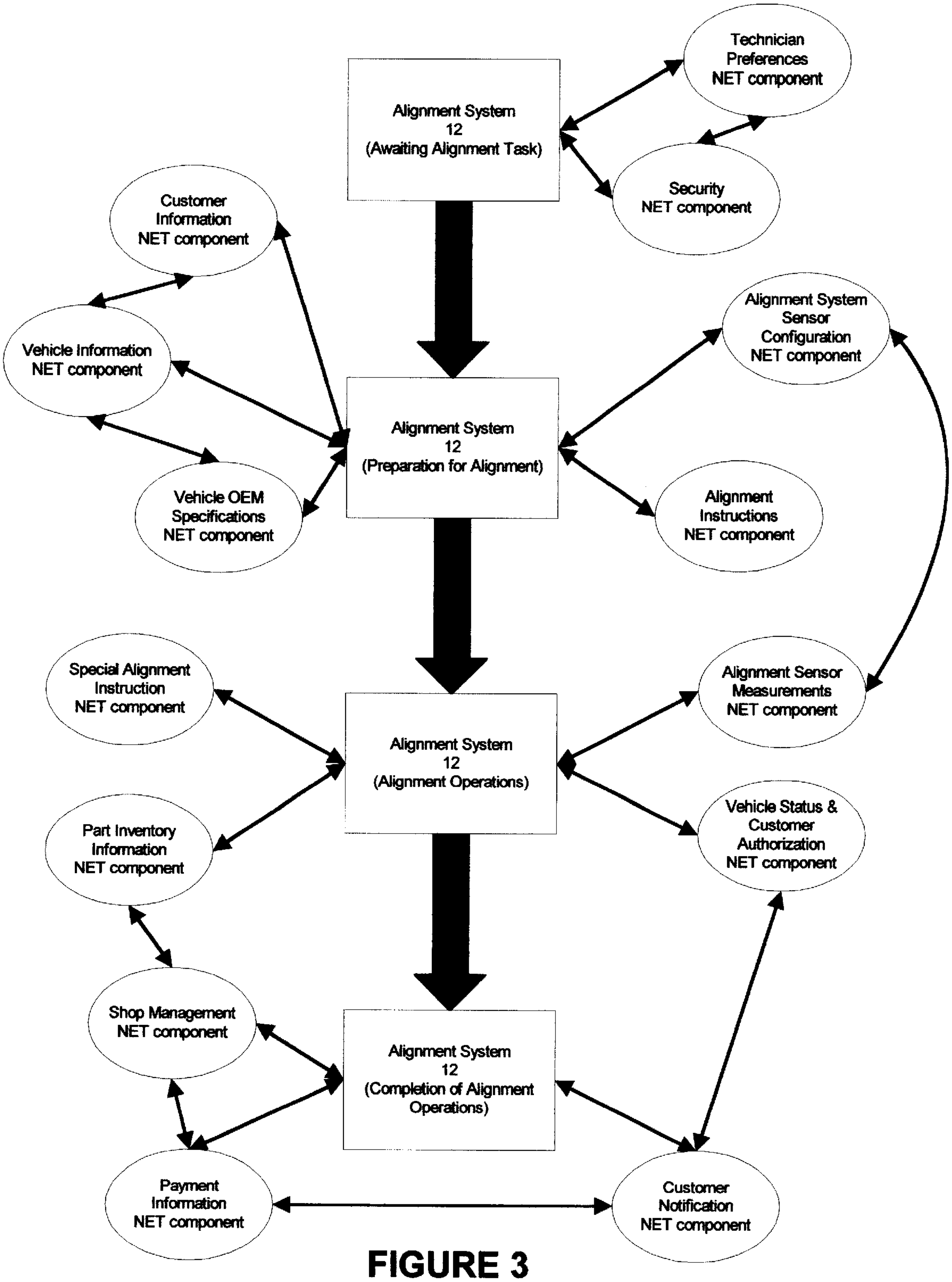
FIG. 3 is an exemplary representation of interactions between the vehicle wheel alignment system of the present invention and a variety of software components during a typical vehicle wheel alignment service sequence.

Turning to FIG. 3, a exemplary workflow diagram is shown illustrating one possible set of interactions between a vehicle wheel alignment system 12 of the present invention and a variety of "dot"-NET software components 15, 17 during a single vehicle wheel alignment operation and associated services.

Prior to the start of an alignment operation, the alignment system 12 may interact with one or more "dot"-NET software components 15, 17 to obtain security authorization for one or more technicians to operate the system, or to configure the system according to a technician's or a service shop's stored personal preferences.

Once a customer brings a vehicle into the service shop for an alignment service, the alignment system 12 may interact directly or indirectly with one or more "dot"-NET software components 15, 17 to obtain information relating to the customer's preferences, information on the vehicle itself, and manufacturer specifications for the vehicle alignment. In addition, the alignment system 12 may interact with one or more "dot"-NET software components 15, 17 to configure the particular type of vehicle alignment sensor which will be utilized in measuring the alignment of the customer's vehicle, and any associated alignment procedure instructions for display to the technician or operator.

During an alignment operation, the alignment system 12 may interact with one or more "dot"-NET software components 15, 17 to obtain any special alignment instructions requested by the technician, to obtain alignment measurements from the alignment sensors employed by the system, and to obtain part inventory or substitution information for components required to repair the vehicle or complete an alignment procedure. The alignment system 12 may further interact with one or more "dot"-NET software components to update the customer (via the customer's previously established notification preferences) of the status of the vehicle service, or to obtain a customer's authorization to perform specific services associated with a vehicle alignment.

Upon completion of an alignment operation, the alignment system 12 may interact with one or more "dot"-NET software components 15, 17 to compile invoice information for a shop management system, communicate with the customer, and obtain or relay payment authorization from the customer to the shop management system.

As is apparent from FIG. 3, the "dot"-NET software components 15, 17 may further interact with each other, for example, software components providing access to a customer vehicle's information may be configured to exchange information with the vehicle itself, or with a database of vehicle specifications to present the alignment system 12 with a complete package of information related to the vehicle. Similarly, the alignment system 12 interactions with a parts inventory software component may be conveyed to a shop management software component to facilitate the generation of a service invoice upon completion of the alignment operation.

Those of ordinary skill in the art will recognize that the interactions shown in FIG. 3 are merely exemplary of some of the possible interactions which may take place between one or more "dot"-NET software components 15, 17 located either one local or remote computer systems during an alignment operation.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An improved vehicle wheel alignment system having a wheel alignment computer, an associated display, and at least one vehicle wheel alignment sensor in communication with the wheel alignment computer for communicating wheel alignment data, said improvement comprising:

said wheel alignment computer configured to utilize at least one NET Web Services software component to provide at least one service associated with a vehicle wheel alignment operation.

2. The improved vehicle wheel alignment system of claim 1 wherein said wheel alignment computer is further configured to exchange payment information with at least one networked remote computer.

3. The improved vehicle wheel alignment system of claim 1 where said NET Web Services software component provides vehicle-specific information.

4. The improved vehicle wheel alignment system of claim 1 where said NET Web Services software component provides alignment angle calculations.

5. The improved vehicle wheel alignment system of claim 1 where said NET Web Services software component provides language translations.

6. The improved vehicle wheel alignment system of claim 1 where said NET Web Services software component interprets said wheel alignment data communicated to said wheel alignment computer from said wheel alignment sensor.

7. The improved vehicle wheel alignment system of claim 1 where said NET Web Services software component provides user authentication.

8. The improved vehicle wheel alignment system of claim 7 wherein said user authentication is facilitated with biometric input.

9. The improved vehicle wheel alignment system of claim 1 where said NET Web Services software component provides a set of configuration preferences.

10. The improved vehicle wheel alignment system of claim 9 wherein said set of configuration preferences are associated with an alignment system configuration.

11. The improved vehicle wheel alignment system of claim 9 wherein said set of configuration preferences are associated with an alignment system operator.

12. The improved vehicle wheel alignment system of claim 9 wherein said set of configuration preferences are associated with a vehicle service shop.

13. The improved vehicle wheel alignment system of claim 9 wherein said set of configuration preferences are associated with a customer.

14. An improved vehicle wheel alignment system having a wheel alignment computer, an associated display, and at least one vehicle wheel alignment sensor in communication with the wheel alignment computer for communicating wheel alignment data, said improvement comprising:

said wheel alignment computer configured to utilize at least one NET Web Services software component to provide at least one service associated with a vehicle wheel alignment operation;

said NET Web Services software component configured to communicate with at least one NET personal information storage space.

15. The improved vehicle wheel alignment system of claim 14 wherein said NET personal information storage space is associated with an technician.

16. The improved vehicle wheel alignment system of claim 14 wherein said NET personal information storage space is associated with a customer.

17. The improved vehicle wheel alignment system of claim 14 wherein said NET personal information storage space is associated with a vehicle.

18. The improved vehicle wheel alignment system of claim 14 wherein said NET personal information storage space is associated with a Original Equipment Manufacturer.

19. The improved vehicle wheel alignment system of claim 14 wherein said NET personal information storage space is associated with a wheel alignment adjustment component.

20. The improved vehicle wheel alignment system of claim 14 wherein said NET personal information storage space is associated with a vehicle service center.

21. The improved vehicle wheel alignment system of claim 14 wherein said NET personal information storage space is associated with said vehicle wheel alignment system.

22. The improved vehicle wheel alignment system of claim 14 wherein said NET personal information storage space is isolated storage.

23. An improved vehicle wheel alignment system having a wheel alignment computer, an associated output device, at least one vehicle wheel alignment sensor in communication with the wheel alignment computer for communicating wheel alignment data, and at least one networked remote computer in communication with said wheel alignment computer, said improvement comprising:

said wheel alignment computer configured to communicate with said at least one networked remote computer via a communications network to retrieve one or more selected NET Web Services software components from said networked remote computer; and said wheel alignment computer further configured to utilize said one or more retrieved NET Web Services software components to provide at least one service associated with a vehicle wheel alignment operation.

24. The improved vehicle wheel alignment system of claim 23 wherein said wheel alignment computer is further configured to utilize said one or more retrieved software components to provide output data to said at least one output device.

25. The improved vehicle wheel alignment system of claim 24 wherein said output device is a display, and said output data includes vehicle wheel alignment measurements.

26. The improved vehicle wheel alignment system of claim 24 wherein said output device is an audio component, and said output data includes speech audio signals.

27. The improved vehicle wheel alignment system of claim 23 wherein said wheel alignment computer is further configured to utilize said one or more retrieved software components to receive input data from at least one input device.

28. The improved vehicle wheel alignment system of claim 27 wherein said input device is an audio component, and said input data includes speech audio signals.

29. An improved vehicle wheel alignment system having a wheel alignment computer, an associated display, at least one vehicle wheel alignment sensor in communication with the wheel alignment computer for communicating wheel alignment data, said improvement comprising:

said wheel alignment computer configured to utilize a NET Web Services software component to convey information associated with a vehicle wheel alignment operation from said wheel alignment computer to at least one recipient.

30. The improved vehicle wheel alignment system of claim 29 wherein said at least one recipient is a customer.

31. The improved vehicle wheel alignment system of claim 29 wherein said at least one recipient is a vehicle manufacturer.

32. The improved vehicle wheel alignment system of claim 29 wherein said information includes said vehicle wheel alignment data.

33. The improved vehicle wheel alignment system of claim 29 wherein said information includes vehicle alignment status data.

34. An improved vehicle wheel alignment system having a wheel alignment computer, an associated display, and at least one vehicle wheel alignment sensor in communication with the wheel alignment computer for communicating wheel alignment data, said improvement comprising:

said wheel alignment computer configured to utilize at least one Web Services software component to provide at least one service associated with a vehicle wheel alignment operation.

35. An improved vehicle wheel alignment system having a wheel alignment computer, an associated output device, at least one vehicle wheel alignment sensor in communication with the wheel alignment computer for communicating wheel alignment data, and at least one networked remote computer in communication with said wheel alignment computer, said improvement comprising:

said wheel alignment computer configured to communicate with said at least one networked remote computer via a communications network to retrieve one or more selected Web Services software components from said networked remote computer; and said wheel alignment computer further configured to utilize said one or more retrieved Web Services software components to provide at least one service associated with a vehicle wheel alignment operation.

* * * * *